United States Patent
Roozeboom et al.

(10) Patent No.: US 11,862,038 B2
(45) Date of Patent: Jan. 2, 2024

(54) SYSTEM, APPARATUS AND METHOD FOR CONDUCTING AND MONITORING COMPUTER-AND-SENSOR BASED PHYSICS EXPERIMENTS

(71) Applicant: Myriad Sensors, Inc., Mountain View, CA (US)

(72) Inventors: Clifton Roozeboom, Mountain View, CA (US); David Bakker, San Jose, CA (US); John Litzenberger, Colorado Springs, CO (US); Robert Douthitt, Mountain View, CA (US); John Bower, Leeds (GB)

(73) Assignee: MYRIAD SENSORS, INC., Mountain View, CA (US)

( * ) Notice: Subject to any disclaimer, the term of this patent is extended or adjusted under 35 U.S.C. 154(b) by 228 days.

(21) Appl. No.: 17/404,176

(22) Filed: Aug. 17, 2021

(65) Prior Publication Data
US 2023/0058032 A1    Feb. 23, 2023

(51) Int. Cl.
| | | |
|---|---|---|
| G09B 23/10 | (2006.01) | |
| G05D 1/00 | (2006.01) | |
| G06F 3/14 | (2006.01) | |
| H04W 4/48 | (2018.01) | |

(52) U.S. Cl.
CPC .......... *G09B 23/10* (2013.01); *G05D 1/0022* (2013.01); *G06F 3/14* (2013.01); *H04W 4/48* (2018.02)

(58) Field of Classification Search
CPC ....... G09B 23/10; H04W 4/48; G05D 1/0022; G06F 3/14
See application file for complete search history.

(56) References Cited

U.S. PATENT DOCUMENTS

| | | | | |
|---|---|---|---|---|
| 2004/0054512 A1* | 3/2004 | Kim | ......................... | G09B 9/00 703/8 |
| 2006/0286526 A1* | 12/2006 | Montgomery | ......... | G09B 23/08 434/302 |
| 2008/0233550 A1* | 9/2008 | Solomon | ................. | G09B 25/00 434/428 |
| 2009/0099824 A1* | 4/2009 | Falash | ...................... | G09B 9/00 703/8 |
| 2017/0269586 A1* | 9/2017 | D'Andrea | .............. | A63H 17/26 |

\* cited by examiner

*Primary Examiner* — Eddy Saint-Vil
(74) *Attorney, Agent, or Firm* — Patterson & Sheridan LLP; Malgorzata A. Kulczycka

(57) ABSTRACT

In some embodiments, a computer-implemented method for measuring motion values associated with movements of an object as the objects drives along a track comprises: receiving, using a wireless network transceiver, experiment instructions for performing an experiment; generating, based on the experiment instructions, driving instructions for causing the object to drive along the track; executing the driving instructions to cause the object to drive along the track; as the object is driving along the track: receiving, from one or more sensors, motion values associated with the movements of the object as the object drives along the track; transmitting, using the wireless network transceiver, the motion values associated with the movements of the object to one or more user devices to cause a user device, from the one or more user devices, to generate and display a graphical representation of the motion values on a display device of the user device.

20 Claims, 10 Drawing Sheets

SYSTEM, APPARATUS AND METHOD FOR CONDUCTING AND MONITORING COMPUTER-AND-SENSOR BASED PHYSICS EXPERIMENTS

FIELD OF THE DISCLOSURE

The present disclosure relates to computer-implemented processes for conducting computer-and-sensor-based physics experiments. More specifically, the disclosure relates to a system, apparatus, and method for conducting physics experiments that involve capturing, using sensors, the movements and physical characteristics of objects driven along physical tracks.

BACKGROUND

Certain concepts in physics, such as speed, velocity, and acceleration, are relatively intuitive because they are rooted in the inherent understanding of the concepts themselves and because they can be personally experienced when a person drives a car or rides on a roller coaster. However, experimenting with speed and other motion-related concepts in school classrooms is surprisingly difficult. In fact, the teaching solutions that are currently available on the market rarely meet the students and teachers' expectations. That is mainly because the solutions are not sufficiently robust for conducting physics experiments in a way that would spark the students' interests in physics and in science in general.

Meanwhile, the Next Generation Science Standards (NGSS) have outlined eight science and engineering practices (SEPs) to be implemented in school classrooms. It is believed that engaging students in science practices helps the students to understand the physics principles and helps them to expand their knowledge. It is also believed that the practices allow engaging the students in the inquiry-based hands-on investigation and exploration of science.

However, inquiry-based learning approaches are often difficult to deploy in school classrooms, especially in middle-school classrooms. That is because the complexity of the concepts taught in middle-schools increases substantially from the elementary-school-level, but only 40% of the middle-school-level teachers have degrees in science. Since middle-level physics is often referred to as the most difficult subject to teach, the middle-school science teachers have long struggled with performing their teaching duties.

High-school-level and college-level physics laboratories usually offer some hands-on-experience as part of the physics curriculum. For example, some labs provide the physics carts that can be driven along benchtop tracks and can allow the students to investigate motion and energy phenomena. An example of the cart is the Newton Laws Experiment cart setup from Pasco Inc. The cart setup is, however, rather expensive and is designed for rather advanced, college-level-physics students.

Other physics laboratories offer computer-based tools for performing simulation. Examples of the simulation tools include the tool from PhET Interactive Simulations, Inc. The tool includes a well-designed and scientifically-vetted platform. However, it does not provide hands-on investigation functionalities and does not fully engage the students in the experiments.

Therefore, there is a need to develop a tool that is configured to program, perform, and analyze physical science experiments and that is accessible and affordable to the scholastic community.

SUMMARY

The appended claims may serve as a summary of the disclosure.

DETAILED DESCRIPTION

Figure 1:
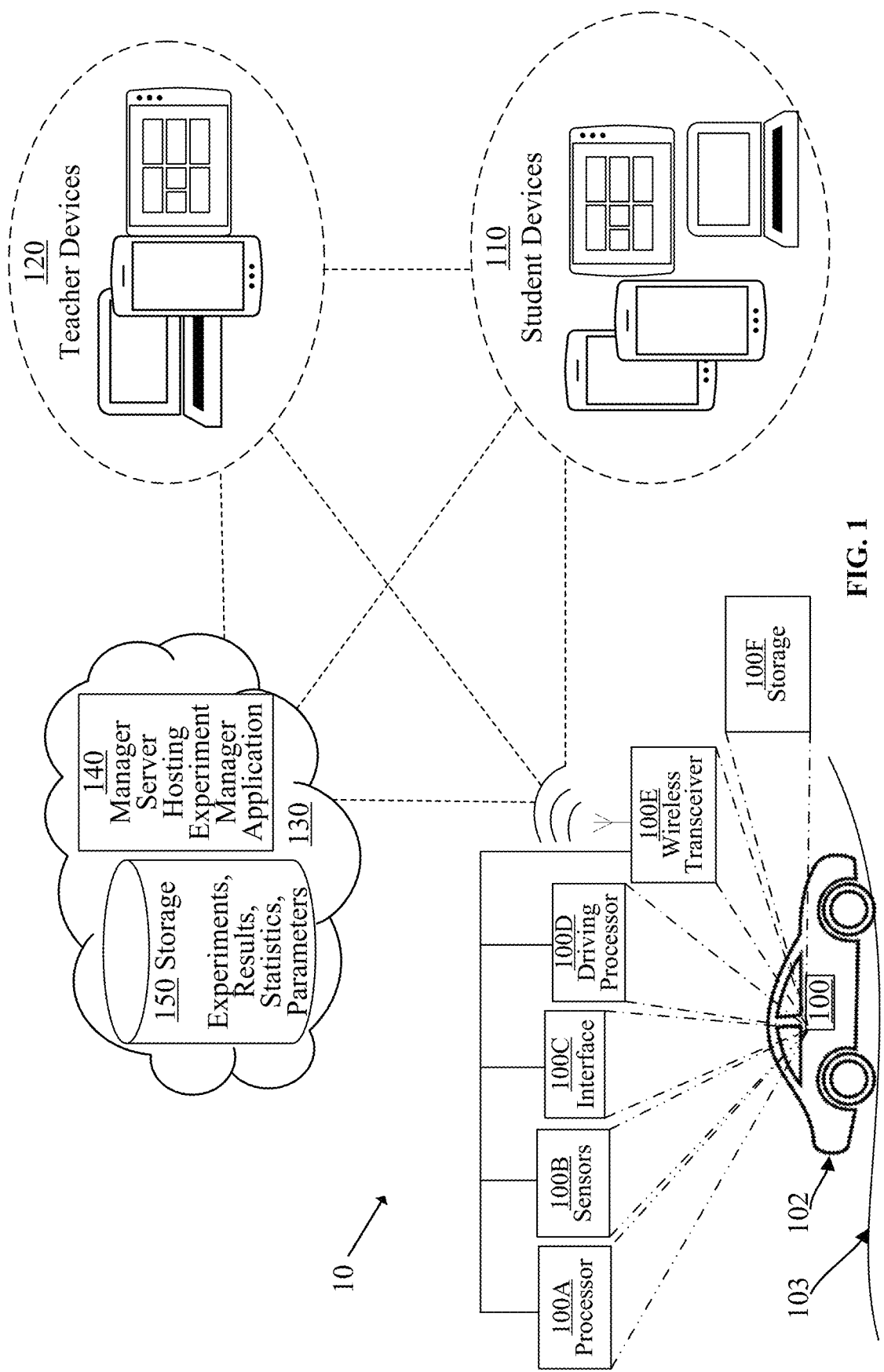
FIG. 1 is a block diagram showing an example computer environment including a sensor device integrated in a moveable object.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. EXAMPLE COMPUTER ENVIRONMENTS
   2.1. EXAMPLE SENSOR DEVICE INTEGRATED IN A MOVEABLE OBJECT
   2.2. EXAMPLE HARDWARE CONFIGURATION OF A SENSOR DEVICE
   2.3 EXAMPLE OBJECT IMPLEMENTED AS A TOY-CAR
   2.4. EXAMPLE TRACKS
   2.5. STUDENT DEVICES
   2.6. TEACHER DEVICES
   2.7. MANAGER SERVER
   2.8. STORAGE
3. EXAMPLE EXPERIMENTS
   3.1. EXAMPLE EXPERIMENT FOR DETERMINING MOTION OF AN OBJECT
   3.2. EXAMPLE EXPERIMENT FOR INTERPRETING DIGITAL DATA
   3.3. EXAMPLE EXPERIMENT FOR DEVELOPING A MODEL
   3.4. EXAMPLE EXPERIMENT FOR RESEARCHING KINETIC ENERGY
4. INTEGRATION AND IMPLEMENTATION OPTIONS
   4.1. OPERATING PLATFORMS
   4.2. AUXILIARY DEVICES 4.2. VISUALIZATION
4.3. INTENDED USER
5. EXAMPLE PROCESS FOR CONDUCTING A COMPUTER-AND-SENSOR BASED PHYSICS EXPERIMENT
6. EXAMPLE PROCESS FOR CONDUCTING A MULTIPLE-OBJECTS EXPERIMENT
7. EXAMPLE PROCESS FOR CONDUCTING A PARAMETRIC EXPERIMENT
8. IMPROVEMENTS PROVIDED BY CERTAIN EMBODIMENTS
9. IMPLEMENTATION MECHANISMS

1. General Overview

In some embodiments, a system, a sensor device integrated in a moveable, physical object, and a method for capturing movement values as the object drives along a physical track are disclosed. One of the benefits of measuring the movement values using the sensor device integrated into the moveable object as the object is driven along the track includes the ability to collect information pertaining to performing scientific experiments related to physics, kinematics, and mechanics. Another benefit includes the ability to compare the collected information with predicted or anticipated results provided by, for example, students and faculty.

A moveable object may be, for example, a toy such as a toy-car or a toy-truck. The object is typically configured to receive wireless instructions for driving the toy along a track. Implementation examples may include driving the toy along a flat track, driving the toy along an up-hill track, driving the toy along a down-hill track, driving the toy along a curved track, and the like.

A moveable object may provide housing to computer processors, wireless transceivers, various sensors, and other components that are described later. The computer processors may be configured to execute program instructions for controlling movements of the object. The wireless transceivers may be configured to wirelessly receive the program instructions, and to transmit the experiment results to user devices.

Some moveable objects may be equipped with, for example, a battery-operated motor that allows turning the wheels and thus driving the object along the track. The objects may be also equipped with a simple brake-system that allows applying brakes to the wheels of the object to cause the object to slow down and/or to stop.

A processor of the moveable toy may receive instructions from a user device, such as a laptop, a PC, and the like. The instructions may be wirelessly communicated from the user device to one or more wireless transceivers implemented in the toy-object. The transceivers may communicate the instructions to the processors implemented in the toy, and the processors may use the instructions to determine the manner in which the toy is to be driven along the track. The transceivers may also be used to transmit, to user devices, information about the physical, kinetical, and mechanical characteristics of the toy, including the speed, velocity, acceleration, and the like, of the toy as the toy is driven along the track.

A processor implemented in a toy-object may be configured to execute the instructions to drive the toy along the track, and as the toy is driving along the track, use the sensors to collect movements information and use the transceivers to transmit the information to user devices to cause the devices to display the movements information on display devices of the user devices.

In some embodiments, a system comprises a plurality of toy-objects and a plurality of tracks. In those embodiments, the system allows to simultaneously conduct a plurality of experiments in which each of the toy-objects is driven along its own track, and information about the speed, velocity, acceleration, and other movement characteristics of the toy-object is captured and transmitted to user computers. Implementation examples may include performing an experiment in which, for example, a few toy-objects race against each other, an experiment in which a few toy-objects drive on separate tracks that intersect with each other, and the like.

Information collected as a toy-object is driven along a track may be compared with prediction information provided by, for example, students. For instance, prior to the ride, the students may compute, based on the characteristics of the toy-object and the characteristics of the track, an arrival time at which the toy reaches, for example, the end of the track. The computed arrival time may be used as the prediction and may be compared with the actual arrival time determined based on the readings provided by the sensors integrated in the toy.

A toy-object may include a compartment for storing one or more computer processors, one or more wireless transceivers, one or more circuit boards with one or more processors and one or more computer-based storage units. The toy may also be equipped with wheels that allow moving the toy along a track and according to driving instructions received by the wireless transceivers of the toy from a user computer.

A track along which a toy may be driven may be constructed using any type of material and may have any type of size or shape. For example, the track may be a competition track having a racing design, a roller-coaster design, and the like. The tracks may be used by groups of students to race their toy-cars, participate in scientific experiments related to physics, kinematics, and mechanics, and learn the movement characteristics of the physical objects.

Tracks may also have different shapes. For example, some tracks may be shaped as a loop that may be either flat or non-flat. Other tracks may be shaped as slopes with different degrees of the slopes and curvatures. Yet other tracks may have an obstacle course and/or one or more crash barriers.

In some embodiments, a sensor device is integrated in a moveable, physical object and is configured to measure movement values as the object drives along a physical track. The sensor device may include one or more processors, and one or more sensors coupled to the one or more processors and may be configured to measure motion values associated with movements of the object as the object drives along a track. The sensor device may also include a wireless network transceiver coupled to the one or more processors, and a non-transitory computer-readable storage medium coupled to the one or more processors and storing one or more sequences of instructions which, when executed by the one or more processors, cause the one or more processors to receive, from the wireless network transceiver, one or more experiment instructions for performing an experiment.

Based on the experiment instructions, the processors may generate one or more driving instructions and may execute the one or more driving instructions to cause the object to drive along the track.

As the object is driving along the track, the motion values associated with the movements of the object along the track may be received from the one or more sensors installed in the object.

The wireless network transceiver may generate motion signals that represent the motion values associated with the movements of the object and transmit the motion values to one or more user devices.

In some embodiments, transmitting the motion values to the one or more user devices causes a user device, from the one or more user devices, to generate a graphical representation of the motion values and display the graphical representation on a display device of the user device.

In some embodiments, a method for measuring movement values of a moveable, physical object as the object drives along a physical track is presented. The method may be implemented in any type of computer device, including, for example, a sensor device that can be integrated in the object that is moveable and configured to drive along the track. For example, the method may be implemented in a toy, such as a toy-car, a toy-track, and the like.

The method comprises receiving, from a wireless network transceiver, one or more experiment instructions for performing an experiment. Based on the experiment instructions, one or more driving instructions for causing the object to drive along the track are generated and executed to cause the object to drive along the track. As the object is driving along the track, motion values associated with the movements of the object along the track are received from one or more sensors. The motion values may be transmitted, using the wireless network transceiver, to one or more user devices. Transmitting the motion values to the one or more user devices may cause a user device, from the one or more user devices, to generate a graphical representation of the motion values and display the graphical representation on a display device of the user device.

2. Example Computer Environments

FIG. 1 is a block diagram showing an example computer environment 10. FIG. 1, the other drawing figures, and all of the description and claims in this disclosure are intended to present, disclose, and claim technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Configurations of computer environment 10 may vary and may depend on the implementations. In some embodiments, environment 10 includes a sensor device 100 integrated in a moveable object 102, one or more student devices 110, one or more teacher devices 120, a cloud storage system 130, a manager server 140 hosting one or more software applications and implemented either in stationary servers or in cloud storage system 130, and one or more storage devices 150 implemented either in stationary servers or in cloud storage system 130. In other configurations, environment 10 may include some, but not all, components depicted in FIG. 1. In yet other configurations, environment 10 may include additional components that are not shown in FIG. 1.

The example components depicted in FIG. 1 communicate with each other. Some, or all components, depicted in FIG. 1 may be equipped with wireless transceivers or with devices allowing the components to access the Internet or other communications network. For example, wireless transceiver 100E of sensor device 100 may enable wireless communications between sensor device 100 and student devices 110, teacher devices 120, cloud storage system 130, and the like.

In some embodiments, sensor device 100 is integrated in moveable toy-object 102, which may be controlled and driven along a track 103. Track 103 may be any type of physical track that is configured to provide a continuous surface on which object 102 may be placed and driven. Object 102 and track 103 are described in detail later.

2.1. Example Sensor Device Integrated in a Moveable Object

In some embodiments, a sensor device 100 is integrated in a physical, moveable object 102. Object 102 may be a toy, a miniature vehicle, a miniature car, and the like.

Sensor device 100 usually comprises a plurality of components, non-limiting examples of which include: one or more processors 100A, one or more sensors 100B, one or more interfaces 100C, one or more driving processors 100D, one or more wireless transceivers 100E, and storage 100F for storing computer instructions that may be executed by processors 100A and 100D. Depending on the implementation, sensor device 100 may include all components 100A-100F, some of components 100A-100F, and/or some additional components not shown in FIG. 1.

Storage 100F may be configured to receive a program code from, for example, manager server 140. The program code may be downloaded onto storage 100F via, for example, interface 100C. Interface 100C may be also configured to modify the program code, initiate execution of the program code, access movement value data (collected as object 102 is driven along track 103) stored in storage 100F, initiate a transfer of the movement value data from storage 100F to any of devices 110-120, storage 150, and/or manager server 140.

The program code may be also provided by any of teacher devices 120, and/or any of student devices 110. For example, the program code may be downloaded by from a teacher device 120, and a student, from his student device 110, may wirelessly send a signal to sensor device 100 to start execution of the program code, and thus to cause object 102 to start driving along track 103 and cause sensor device 100 to collect movement information as object 102 is driving along track 103.

According to another example, the program code may be downloaded to storage 100F, via interface 100C, before sensor device 100 is deployed in environment 10, and initiated and started upon receiving a wireless signal from either a teacher device 120, or a student device 110.

The program code may include one or more sequences of instructions which, when executed by processors 100A and/or driving processors 100D, cause the processors to receive from wireless network transceiver 100E, one or more experiment instructions for performing an experiment. As described above, execution of the program code may be initiated upon receiving an initiation signal from a teacher device and/or a student device. The experiment may be described by the experiment instructions and designed to cause toy-object 102 to drive along track 103. Examples of experiments are described later.

Once the experiment instructions are received by sensor device 100, processors 100A and/or 100D may generate, based on the one or more experiment instructions, one or more driving instructions for causing object 102 to drive along track 103. This may include generating, based on the driving instructions, one or more driving signals and sending the signals to, for example, wheels of object 102, which in turn may cause moving object 102 along track 103. The driving signals may be generated in such a way that the speed with which object 102 is driven along track 103 corresponds to the speed set up in the experiment instructions. The speed may vary and may depend on the many parameters set forth in the experiment. The example parameters are described later.

As the driving instructions are executed and object 102 is driving along track 103, sensors 100B installed in sensor device 100 collect motion/movement value data and movement characteristics of moving object 102. Furthermore, as object 102 is driving along track 103, sensor 100B transmits the collected motion movement value data to one or more devices, such as any student device 110, teacher device 120, manager server 140 and/or storage device 150. Transmitting the value data may include, for example, generating motion signals based on the motion movement data that represent the motion values associated with the movements of object 102, providing the motion signals to wireless transceiver 100E and causing the transceiver to wirelessly transmit the motion signals to the user devices.

Upon receiving the motion signals, the user device may generate a graphical representation of the motion signals and display the graphical representation of the motion signals on a display device of the user device.

2.2. Example Hardware Configuration of a Sensor Device

Figure 2A:
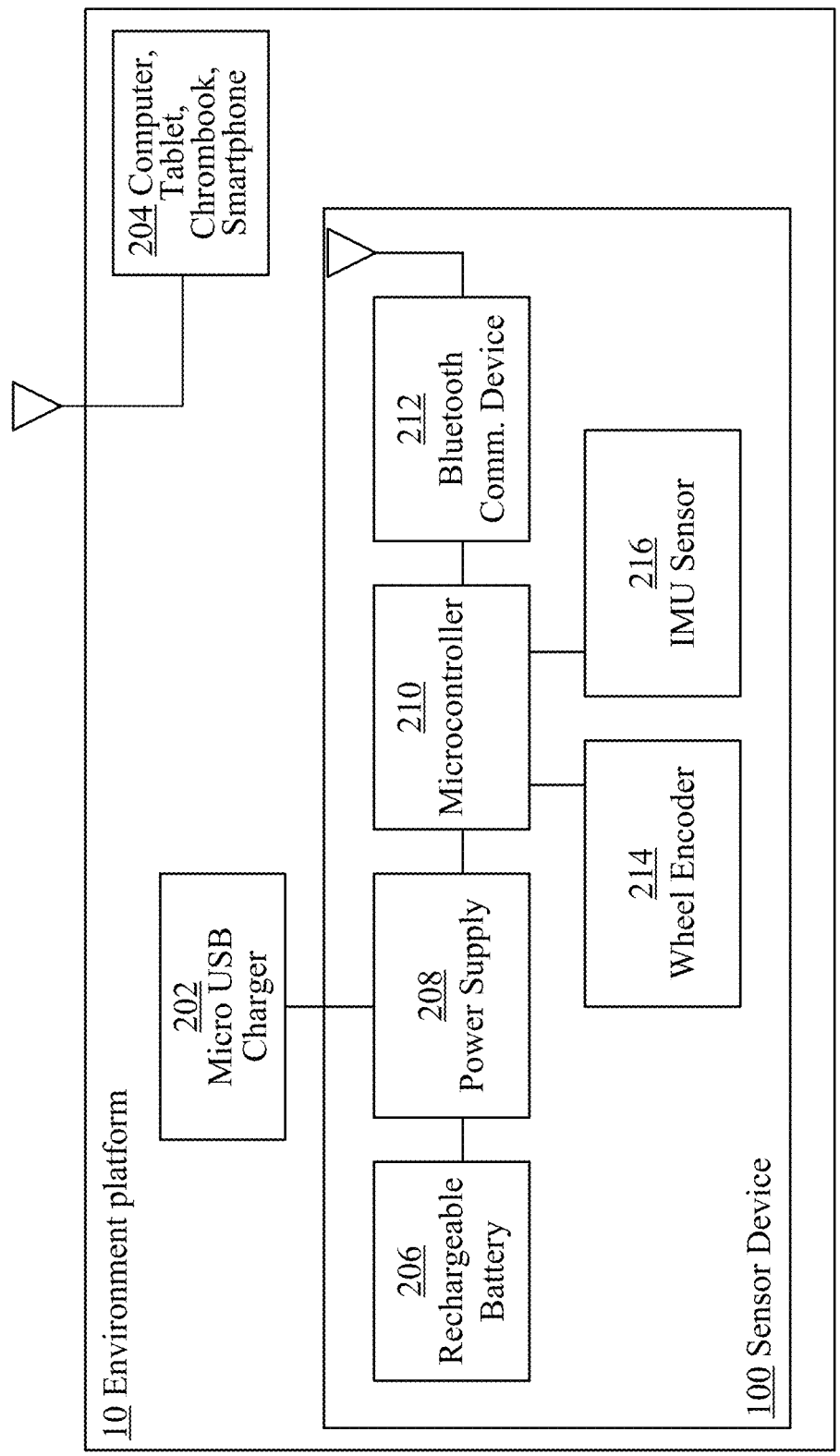
FIG. 2A is a block diagram showing an example hardware configuration of a sensor device.

FIG. 2A is a block diagram showing an example hardware configuration of a sensor device. In some embodiments, sensor device 100 (also depicted in FIG. 1) comprises a rechargeable battery 206, a power supply 208, a microcontroller 210, a Bluetooth communications device 212, a wheel encoder 214, and an inertial measurement unit (IMU) encoder 216. Rechargeable battery 206 may be configured to provide power to power supply unit 208, which may be also chargeable via a micro USB charger 202.

Power supply 208 may be configured to provide power to microcontroller 210, which may be configured to execute program instructions to perform the tasks of sensor device 100, as described above. The program instructions may be provided to microcontroller 210, via Bluetooth communications device 212, from any type of user device 204, such as a computer, tablet, Chromebook, or a smartphone. Bluetooth communications device 212 and user device 204 may communicate with each other wirelessly, as shown in FIG. 2A, or using any type of cable-based communications connection (not shown).

In some embodiments, microcontroller 210 is configured to generate, based on the program instructions, signals for controlling wheels of object 102 in which sensor device 100 is implemented. This may include generating control signals for controlling a position, speed, acceleration, and the like of object 102, and therefore, to move object 102 along track 103, according to the speed, velocity, acceleration, and the like, along track 103.

IMU sensor 216 is an electronic device that measures and reports a g-force, acceleration, angular rate, and optionally the orientation of object 102 in which sensor device 100 is integrated. IMU sensor 216 measures the force, etc., using a combination of accelerometers, gyroscopes, and magnetometers. IMU 216 may be configured to determine the linear acceleration using one or more accelerometers and to determine the rotational rate using one or more gyroscopes. In some embodiments, IMU sensor 216 includes a magnetometer which may be used to determine a heading reference. A typical configuration of IMU 2016 contains one accelerometer, gyro, and magnetometer per axis for each of the three principal axes: pitch, roll, and yaw.

2.3. Example Object Implemented as a Toy-Car

Object 102 that provides housing to sensor device 100 and that is configured to drive along track 103 may be implemented as any type a physical object can be moved along track 103. Object 102 is usually a relatively small object that can be placed on a laboratory table and on track 103, and at the same time, large enough to house sensor device 100 along with its components, such as processors, power supply, IMU unit, and the like. Example implementation of object 102 as a toy-car is depicted in FIG. 2B.

Figure 2B:
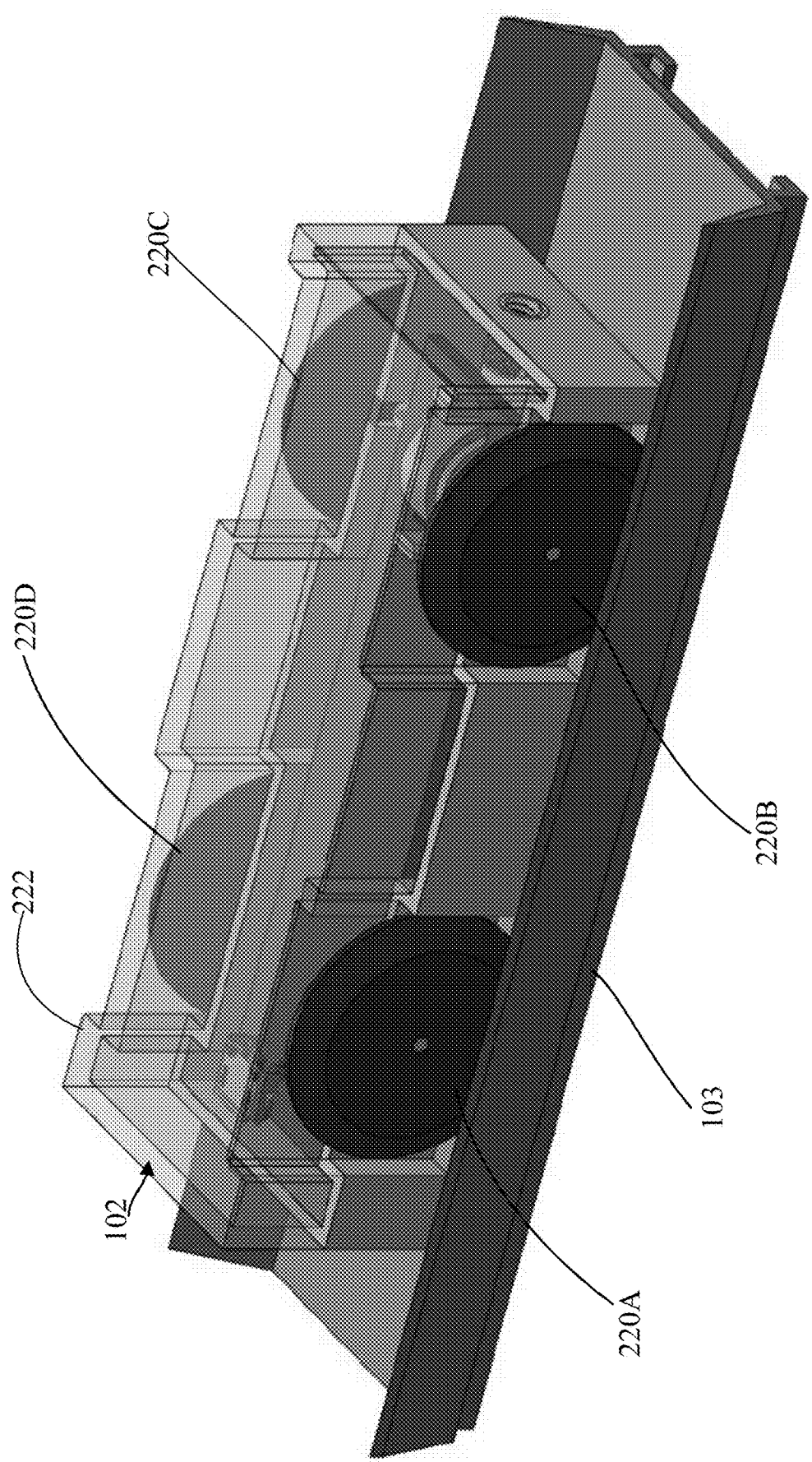
FIG. 2B is a block diagram showing an example object implemented in a toy-car.

FIG. 2B is a block diagram showing an example object 102 implemented in a toy-car. The toy-car is usually designed to have a compartment 222 that is large enough to house sensor device 100, described in FIGS. 1 and 2A. At the same time, the toy-car needs to be small enough, so that it is easy to carry it, place it on a laboratory table, and drive it along track 103.

In some embodiment, object 102 implemented as a toy-car comprises four wheels 220A-220D, as shown in FIG. 2B. The wheels are usually pivotally mounted on two separated axles, and each axle connects two wheels of the four wheels and is communicatively coupled with a servo-mechanical mechanism that provides torque to the wheels.

Wheels are simple machines configured to reduce the force of friction, and thus to allow moving object 102 along track 103. The wheels also help to turn object 102 with more force or help object 102 to turn faster than if movements of object 102 were dependent only on gravity, pushing by hand, and the like. When a wheel turns, its edge goes around faster than the middle of the wheel. Furthermore, by applying a certain amount of torque to an axle, the wheels attached to the axle can rotate at a speed that is a function of the torque, the size of the wheel, characteristics of an internal lining of track 103, and the like.

In some embodiments, two wheels attached to an axle rotate at different speeds. The wheels spin at different speeds usually when object 102 is turning. During a turn, each wheel travels a different distance through the turn, and the inside parts of the wheels travel a shorter distance than the outside parts of the wheels. Since speed is equal to the distance traveled by the wheel divided by the time it takes for the wheel to cover that distance, the wheels that travel a shorter distance travel at a lower speed. In some embodiments, object 102 implements a differential that allows transmitting different amounts of torque to the wheels to allow them to rotate at different speeds as object 102 turns.

2.4. Example Tracks

A track is a physical path along which toy-object 102 may be driven. The track may be constructed using any type of material, such as wood, plastic, cardboard, metal, and the like, and may have any size or shape. The tracks may be used by groups of students to race their toy-cars, participate in scientific experiments related to physics, kinematics, and mechanics, and learn the movement characteristics of the physical objects driven along the tracks.

Tracks may have different shapes. For example, the tracks may be straight away, circular, oval, and the like. Some tracks may be shaped as a loop that may be either flat or non-flat. Other tracks may be shaped as slopes with different degrees of slopes and curvatures. Yet other tracks may have an obstacle course and/or one or more crash barriers.

Figure 2C:
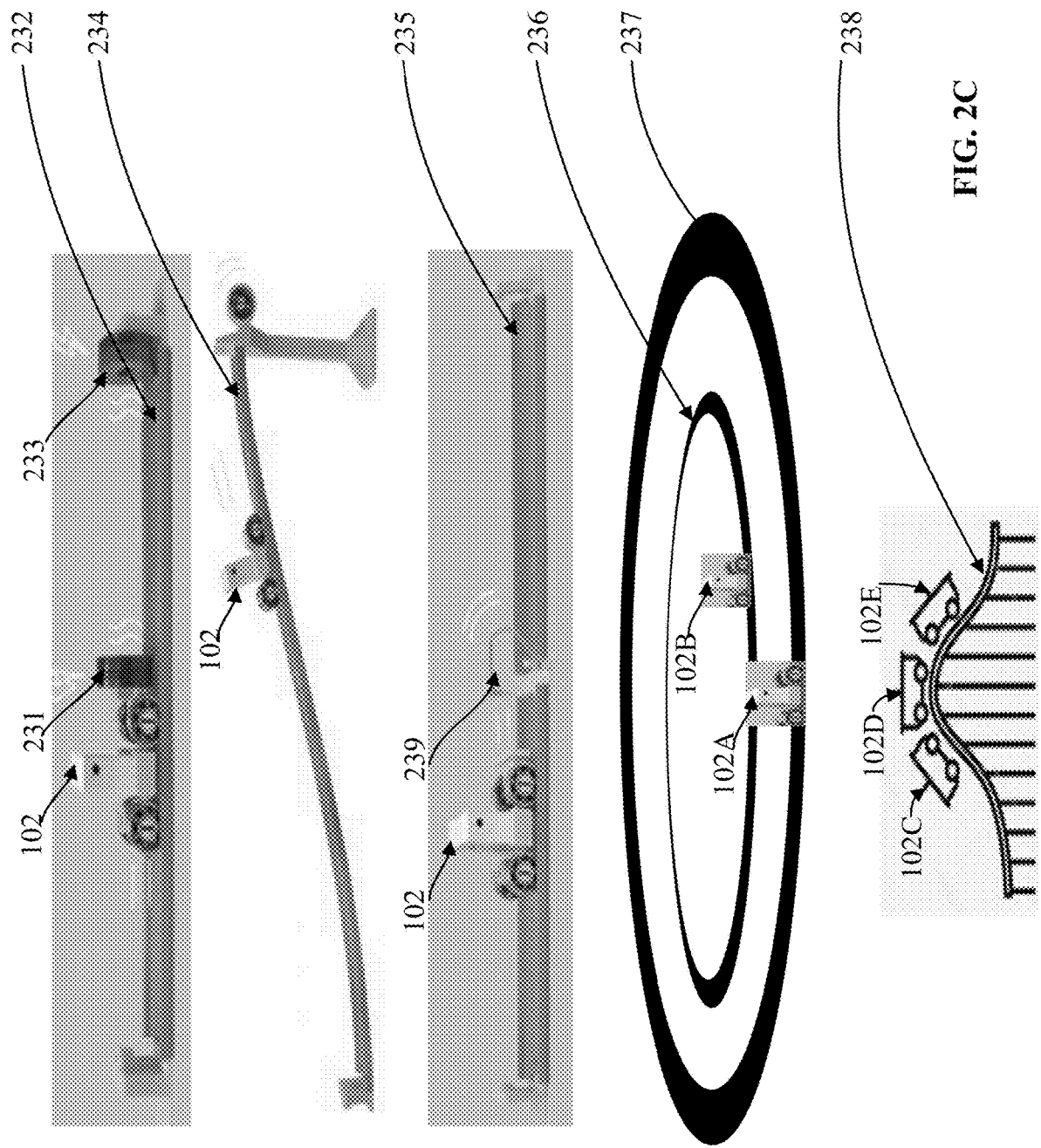
FIG. 2C is a block diagram showing examples of tracks.

FIG. 2C is a block diagram showing examples of tracks. The examples depicted in FIG. 2C are provided to merely illustrate a subset of all possible shapes of tracks and should not be considered as limited in any way.

The examples depicted in FIG. 2C include a flat track 232 with obstacles, an uphill track 234, a flat track 235 with a barrier, a plurality of racing tracks 236-237, and a roller-coaster-type track 238. Flat track 232 with obstacles may include one or more obstacles 231 and one or more buffers 233. This track may be used to test and experiment with the impact that the obstacles 231 and buffers 233 may have on toy-object 102 as object 102 is driven along track 232 with different speeds, and the like. Variations of track 232 may include a plurality of flat tracks arranged in parallel and allowing a plurality of toy-objects to race along the tracks.

Uphill track 234 may include a track that has an increasing height from a start point and toward an end point. This track may be used to test and experiment with the changes in speed of toy-object 102 as the object is driven up the hill. Variations of track 234 may include a plurality of uphill tracks arranged in parallel and allowing a plurality of toy-objects to race along the tracks.

In some embodiments, uphill track 234 may be used in the opposite direction, i.e., to test and experiment with the changes in speed of toy-object 102 as the object is driven down the hill. Variations of track 234 may include a plurality of downhill tracks arranged in parallel and allowing a plurality of toy-objects to race along the tracks.

Flat track 235 with a barrier may include one or more barriers 239. This track may be used to test and experiment with the impact the barrier may have on toy-object 102 as the object hits barrier 239 at different speeds, with different force, and the like. Variations of track 234 may include a plurality of flat tracks with barriers arranged in parallel and allowing a plurality of toy-objects to race along the tracks.

Plurality of racing tracks 236-237 may include a plurality of flat concentric tracks. Each of toy-objects 102A-102B may be driven on its own track. That type of track may be used by groups of students to race their toy-cars along the tracks, test how the weight of the toy impacts the speed of the toy, and the like. Variations of tracks 236-237 may include a plurality of concentric tracks having different elevations and/or multiple curves, to allow a plurality of toy-objects to race along the tracks.

Roller-coaster-type track 238 may include a track that has different elevations and a plurality of curves and turns. That type of track may be used by groups of students to test how the elevations and curves impact the speeds of toys 102C, 102D and 102E.

One can envision that in addition to tracks 232, 234-238, other tracks may also be designed and used for the purpose of conducting and monitoring computer-and-sensor based physics experiments.

2.5. Student Devices

Referring again to FIG. 1, in some embodiments, computer environment 10 comprises one or more student devices 110. Student devices 110 may include various user devices, such as laptops, smartphones, PDAs, tablets, PCs, workstations, and the like.

Student devices 110 may be configured to execute software applications that allow downloading applications and data from storage 150. For example, student devices 110 may be configured to download experiment applications, experiment data, experiment results, statistical information about the experiments, experiment parameters, and the like, from storage 150.

Upon downloading one or more experiment applications and data for an experiment, from storage 150, student devices 110 may execute the experiment applications, and send instructions either directly to object 102 or to manager server 140 to initiate the experiment.

Upon sending the instructions to initiate an experiment, student devices 110 may either directly control parameters of object 102 and send control parameters to manager server 140 or request that manager server 140 control object 102 during the experiment.

Once an experiment is completed (or is in progress), the results of the experiment may be transmitted, by wireless transceiver 100E, from object 102 to either directly to student devices 110 or to manager server 140. Furthermore, or alternatively, the results of the experiment may be communicated to one or more teacher devices 120. Moreover, the results of the experiment may be transmitted to storage 150 for storing.

2.6. Teacher Devices

Referring again to FIG. 1, in some embodiments, computer environment 10 comprises one or more teacher devices 120. Teacher devices 120 may include various user devices such as laptops, smartphones, PDAs, tablets, PCs, workstations, and the like.

Teacher devices 120 may be configured to execute software applications that allow downloading applications and data from storage 150. For example, teacher devices 120 may be configured to download experiment applications, experiment data, experiment results, statistical information about the experiments, experiment parameters, and the like, from storage 150.

Upon downloading one or more experiment applications and data for an experiment, from storage 150, teacher devices 120 may execute the experiment applications, and send instructions either directly to object 102 or to manager server 140 to initiate the experiment. Furthermore, teacher devices 120 may forward the experiment applications to student devices 110 and cause student devices 110 to execute the experiment applications to conduct the corresponding experiment.

In some embodiments, teacher devices 120 may initiate an experiment on their own. Alternatively, teacher devices 120 may send instructions to initiate an experiment to one or more student devices 110, which in turn, may either directly control parameters of object 102 and send control parameters to manager server 140 and request that manager server 140 control object 102 during the experiment.

Once an experiment is completed (or is in progress), the results of the experiment may be transmitted, by wireless transceiver 100E, from object 102 to either directly to teacher devices 120 or to manager server 140. Furthermore, or alternatively, the results of the experiment may be communicated to one or more student devices 110. Moreover, the results of the experiment may be transmitted to storage 150 for storing.

2.7. Manager Server

Referring again to FIG. 1, manager server 140 may be configured to manage conducting and monitoring computer-and-sensor based physics experiments conducted in computer environment 10. Manager server 140 may be implemented in a standalone server, a distributed server system, in a cloud system, and the like.

Manager server 140 may be configured to host a variety of applications, including software applications configured to define scientific experiments, software applications for conducting scientific experiments, software applications for collecting data as scientific experiments are conducted, and the like.

Manager server 140 may be configured to receive instructions to start, end, and/or resume scientific experiments. For example, manager server 140 may be configured to receive instructions from student devices 110 and/or teacher devices 120 to initiate an experiment, to stop the experiment, and/or to resume the experiment. Upon receiving such instructions, manager server 140 may download a corresponding experiment application onto sensor device 100, integrated in object 102. Once transceiver 100E (shown in FIG. 1) receives the experiment application, the transceiver may communicate to manager server 140 that the experiment is ready to be initialized. In response thereto, manager server 140 may either initiate and start the experiment itself or cause student devices 110 and/or teacher devices 120 to initiate the experiment.

Once the experiment is finished, stopped, or otherwise terminated, manager server 140 may request the results of the experiment and, upon receiving the results, store them in, for example, storage 150.

Manager server 140 may further be configured to receive updates for experiment applications, provide a GUI for updating and modifying the experiment applications, provide a GUI and tools for analyzing results of the experiments and the like.

2.8. Storage

Referring to FIG. 1, storage 150 may be configured to store and serve experiment applications and experiment data for conducting and monitoring computer-and-sensor based physics experiments. Storage 150 may be implemented in a standalone server, a distributed server system, in a cloud system, and the like.

Storage 150 may be configured to store results, statistical data, and parameters for a variety of applications, including software applications configured to define scientific experiments, software applications for conducting scientific experiments, software applications for collecting data as scientific experiments are conducted, and the like. For example, storage 150 may be configured to store experiment initialization parameters for an experiment, experiment results provided once the experiments were completed and stopped, statistical information about the experiments, statistical information about the users who participated in the experiments, ratings of the experiments, grades given to the user who participated in the experiments, and the like.

Information for storing in storage 150 may be communicated from manager server 140, object 102, student devices 110, and/or teacher devices 120 to storage 150 wirelessly or using any type of communications connection. Similarly, information already stored on storage 150 may be wirelessly communicated from storage 150 to manager server 140, object 102, student devices 110, and/or teacher devices 120 using any type of communications connection.

3. Example Experiments

In some embodiments, a system, an apparatus, and a method are configured for conducting and monitoring various computer-and-sensor based physics experiments. The experiments may be distributed from a central distribution server (such as manager server 140) or may be distributed by educators and students interacting with manager server 140, shown in FIG. 1.

Generally, the experiments that may be conducted and monitored using the presented system/approach/method allow the qualitative and quantitative analysis of various physics principles and scientific laws. Examples of experiments include experiments designed to measure kinetic energy in a roller coaster, experiments implementing bumper and crash barrier safety designs, experiments implementing energy dissipation to friction, experiments implementing races, experiments for pinewood derby-style competitions, experiments implementing elastic and inelastic collisions, experiments for modeling aerodynamics of a car, and the like.

According to one example, an experiment includes testing a vehicle's speed, acceleration, force, and the like of object 102 as object 102 is driving along track 103, which may have any shape and size, as shown in FIG. 2C.

According to another example, an experiment includes testing relative speeds, accelerations and forces, and the like, of a plurality of objects 102 as the objects are driven along their corresponding tracks, each of which may be any of the tracks shown in FIG. 2C.

According to other example, an experiment includes testing the relationship between a weight of object 102 (or a plurality of objects 102) and the corresponding speed, acceleration, and the like, as object 102 (or the plurality of objects 102) is driven along it track 103 (or their corresponding tracks 103).

Typical experiment setups involve dividing a group of students into a few teams, each team having 3-4 students. Every team has access to a computer-and-sensor based setup for performing physics experiments, a computer, kit materials including a track, weights, a tape, and the like. The time allocated to performing an experiment is usually 3-4 hours over multiple class periods. To perform the experiment, students are usually present in large classrooms to allow setting up the tracks and conducting the experiment.

3.1. Example Experiment for Determining Motion of an Object

An example experiment that may be conducted using a computer-and-sensor system described herein allows determining motion of an object. The experiment may include planning an investigation to provide evidence that the change in an object's motion depends on the sum of the forces on the object and the mass of the object.

Using the platform described herein, students can collect data required for a particular experiment without receiving detailed instructions from a teacher. The students may use modern equipment such as ultrasonic rangefinders that require a direct line-of-sight between the sensor and object and may use large objects of which the sonar signal can bounce off. The students may use carts like the carts having roller coaster designs and the like.

3.2. Example Experiment for Interpreting Digital Data

An example experiment may include constructing and interpreting graphical displays of data to describe the relationships between kinetic energy and the mass of an object and the speed of an object.

Using the platform described herein, a student may generate, display, and analyze scaffolded data representations of motion. While the intuitiveness of speed is something that everyone is familiar with, the data visualizations can help the students to determine the relevant data separated from, for example, errors and noise. The data may be visualized in a computer-graphics application that can be provided by the platform.

3.3. Example Experiment for Developing a Model

An example experiment may include developing a model to describe that, when the arrangement of objects interacting at a distance changes, different amounts of potential energy are stored in the system.

Development of accurate models of physical phenomena is a fundamental practice that many students and teachers struggle with. For example, the mathematical model of friction indicates that the force of friction corresponds to a coefficient multiplied by a normal force exerted on the object, $F_f=\mu/N$. This is a very simple mathematical model, but it is difficult to experience or quantify in the real world. With the tools provided herein and using the data visualization applications, a student may build a model of the friction phenomena. The model building tool helps the students to develop valuable skills and increase their understanding of physics concepts.

3.4. Example Experiment for Researching Kinetic Energy

An example experiment may include constructing, using, and presenting arguments to support the claim that when the kinetic energy of an object changes, energy is transferred to or from the object.

The platform presented herein allows performing research related to the kinetic energy conversion and generating and expanding the energy model to include the impact of various forces acting on object 102 driving along track 103.

4. Integration and Implementation Options

4.1. Operating Platform

A system, an apparatus, and a method for conducting and monitoring computer-and-sensor based physics experiments may be implemented in a standalone product or as part of an existing application platform such as, for example, the PocketLab Notebook. The product is primarily intended for middle-school students. However, the product is also suitable for elementary-school students and college-level physics students.

In some embodiments, an operating platform supporting an approach for conducting and monitoring computer-and-sensor based physics experiments integrates various components, including hardware and software elements.

Figure 3A:
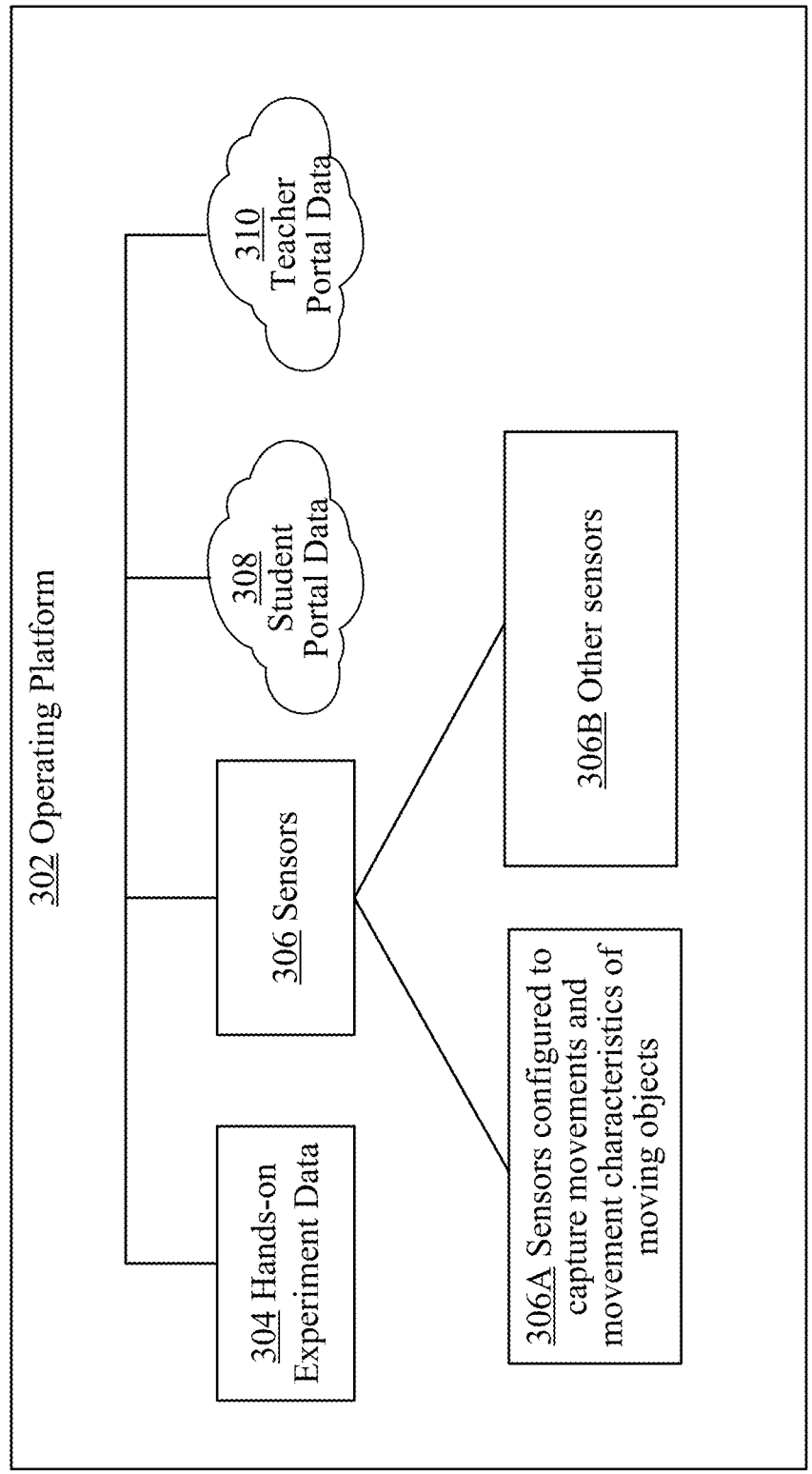
FIG. 3A is a block diagram showing an example operating platform.

FIG. 3A is a block diagram showing an example operating platform 302. In some embodiments, platform 302 houses hands-on experiment data 304, a plurality of sensors 306, student portal data 308, teacher portal data 310, and optionally other components, such as transceivers, communications protocol data, operating system data, and the like. Data 304, 308, and 310 may be stored in standalone server and/or cloud-based systems. The applications may be served from application servers and/or virtual machines supported by application servers.

Hands-on experiment data 304 may include experiment applications described before, experiment result data, experiment rating data, and the like.

Plurality of sensors 306 may include sensors 306A that are configured to capture movements and movement characteristics of moving objects including, for example, object 102 depicted in FIG. 1. Sensors 306A may be electronic devices that are configured to measure and report values of g-force, acceleration, angular rate, and optionally the orientation of object 102 in which sensors 306A are integrated. Sensors 306A may measure the values of g-force, etc., using a combination of accelerometers, gyroscopes, and magnetometers. They may be configured to determine, for example, the linear acceleration using one or more accelerometers and to determine the rotational rate using one or more gyroscopes. Typical sensors 306A include one accelerometer, gyroscope, and magnetometer per axis for each of the three principal axes: pitch, roll, and yaw.

Plurality of sensors 306 may include sensors 306B that are configured to capture, for example, weather data, air quality data, GPS data, and the like. That data may be used to, for example, design and conduct other science experiments for students and teachers.

In some embodiments, sensor device 100 (shown in FIG. 1) uses wireless electronics and miniaturized sensors mounted inside of a durable plastic car body of object 102 and is small enough to enable driving object 102 along a miniature track, as shown in FIG. 2C.

Object 102 may be configured to transmit data to any computer, tablet, smartphone, or the like, using Bluetooth-based communications connections. One of the objectives of implementing object 102 is to provide a vehicle for housing a sensor device configured to measure position, speed, velocity, acceleration, and force of object 102 as object 102 drives along a track.

In some embodiments, a system/apparatus/method is implemented in a computer-based platform that supports any of the following operating systems: Chrome, iOS, Windows, Android, or Mac. The implementations may provide assistance, utilities and detailed explanations of physics experiments, and therefore, no-prep lesson materials for teachers may be required.

4.2. Auxiliary Devices

In some implementations of the presented system/apparatus/method, various auxiliary devices are integrated and used in cooperation with a sensor device described herein. Examples of the auxiliary devices include speedometers, gages, clocks, and the like.

Figure 3B:
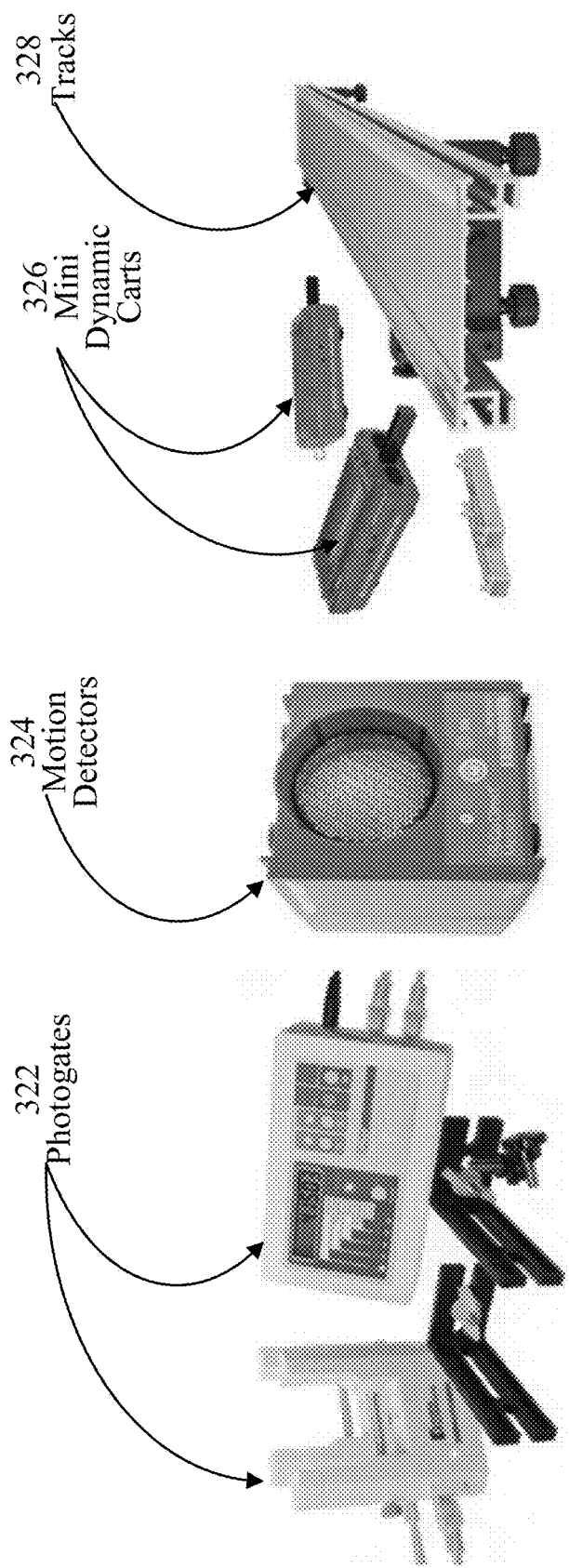
FIG. 3B is a block diagram showing examples of auxiliary devices used in cooperation with a sensor device.

FIG. 3B is a block diagram showing examples of auxiliary devices used in cooperation with a sensor device. In the depicted example, the auxiliary devices include photogates 322, motion detectors 324, mini dynamic carts 326, and tracks 328.

Photogates 322 are usually used to study free falls, rolling objects, collisions, and pendulums. More specifically, photogates 322 allow to determine the accurate timing of events within physics experiments, and to study free falls, air track collisions, pendulum periods, and the speed of a rolling object. The photogate packages usually include an accessory rod for mounting to, for example, a ring stand. Photogates 322 usually have input ports so multiple gates can be connected in a daisy-chain configuration with up to four gates going to a single interface channel.

Some of photogates 322 may be configured to operate in a laser gate mode, which requires the addition of a common pen laser. The laser may be mounted some distance from the gate to allow taking speed measurements of large objects such as model cars or model trucks.

Photogates are essentially very accurate stop watches. The determined time may be used with additional information such as the distance traveled to calculate the speed of moving object 102. Photogates only calculate speed data for a particular location or calculate average speed over a specific distance. They do not, however, provide acceleration data or force data.

Motion detectors 324 may include ultrasonic rangefinders that can measure position, velocity, and acceleration. They usually operate within a specific range (e.g., 1 to 10 feet from the sensor) and in one-dimension.

Mini dynamic carts 326 and tracks 328 may be used to perform experiments when studying the laws of motion. Mini dynamic carts 326 are scaled-down systems configured to teach velocity, acceleration, the Newton first and second laws, friction, and the conservation of momentum and energy. The carts are usually made out of plastic and have attachable spring steel bumpers, deep wells for weights and low friction wheels that snap into place on the carts.

Tracks 328 may be implemented as benches that come with compatible gear for studying the laws of motion. Tracks 328 may be coated with a clear anodized finish to lower friction between an object driven along the track and the bare metal finish of the track. The tracks may come with adjustable feet and ring-stand brackets to make it easy to level or turn it into a ramp.

4.2. Visualization

In some embodiments, a method presented herein is configured to generate visual representations of experiments, results of the experiments, scores and rating of users who participated in the experiments, and the like. The visual representations may be transmitted to display devices to cause the display devices to launch browsers and generate GUIs depicting the visual representations in forms of charts, tables, graphs, and the like.

Presenting and visualizing data may include generating a GUI that depicts information about, for example, top speed, distance traveled, maximum g-forces, gauges and speedometer readings, and the like, all collected during the duration of the experiment. The visualization of the data may include line graphs, scatter plots, bar charts, pie charts, and the like.

4.3. Intended User

A system, an apparatus, and a method for conducting and monitoring computer-and-sensor based physics experiments may be implemented as a tool to be used primarily by middle-school students. However, the tool may be adapted to the requirements of elementary-school level so that it could be used by elementary-school students. Furthermore, the tool may be scaled up so that it could be used by college-level physics students. The tool may be also used by teachers, researchers, and the like.

Referring again to FIG. 3A, a student-user may access operating platform 302, and more specifically to download a client software application that includes a student portal data 308 that, when executed, allows the student to draft laboratory reports, and analyze results of scientific experiments. A teacher student may access operating platform 302 and download a client software application that includes a teacher portal data 310 that, when executed, allows the teacher to monitor the execution of experiments by students, prepare for the lessons, and evaluate the students' progress in studying the scientific concepts.

Figure 4:
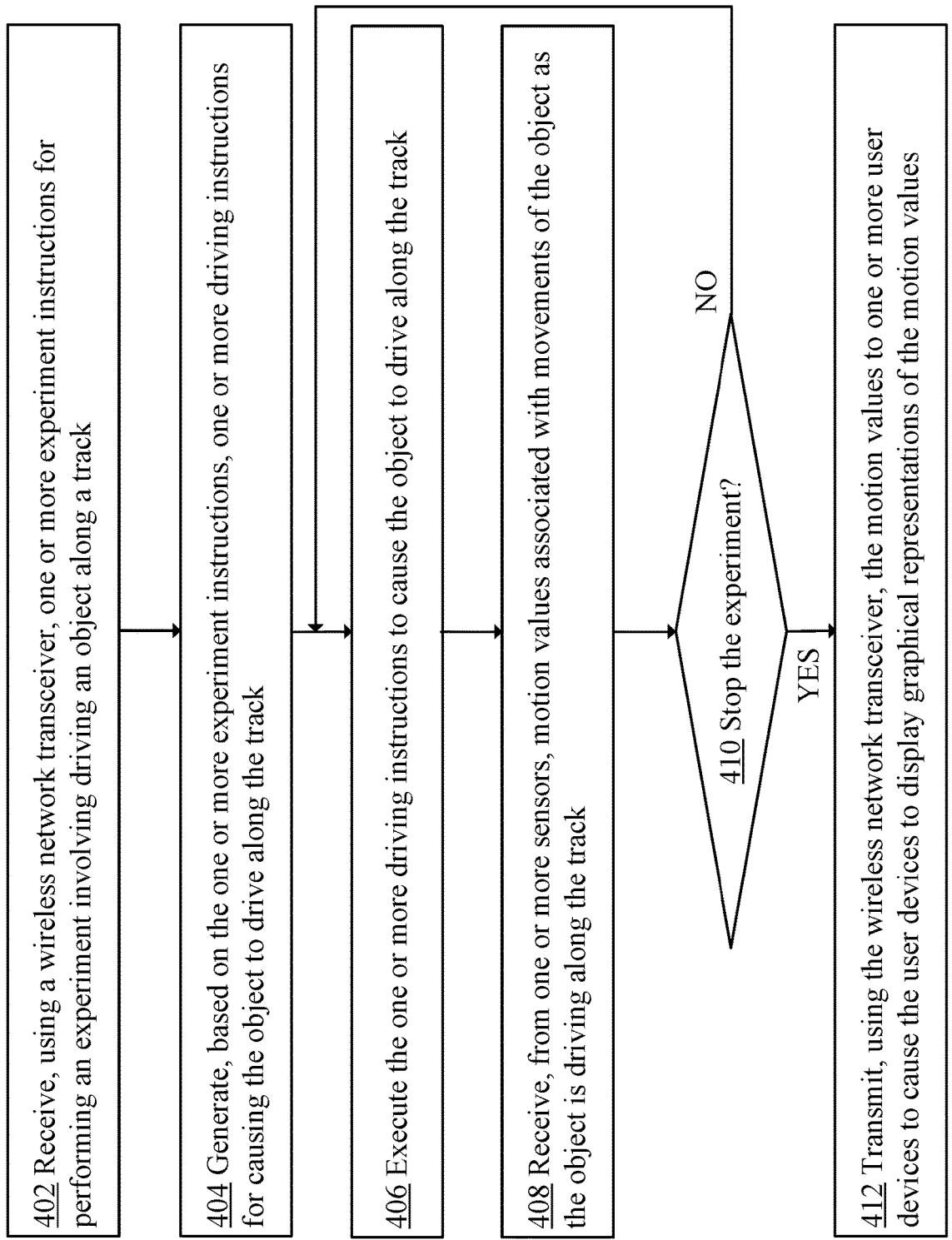
FIG. 4 is a flow diagram showing an example process of conducting and monitoring a computer-and-sensor based physics experiment executed by a sensor device.

5. Example Process for Conducting a Computer-and-Sensor Based Physics Experiment FIG. 4 is a flow diagram showing an example process of conducting and monitoring a computer-and-sensor based physics experiment executed by a sensor device. The example process depicted in FIG. 4 may be executed by any type of sensor device, including sensor device 100 depicted in FIGS. 1 and 2A.

As described before, a typical sensor device includes one or more processors and one or more sensors coupled to the processors and configured to capture motion values associated with movements of an object housing the sensor device as the object drives along a track. The sensor device may also include a wireless network transceiver coupled to the processors and a non-transitory computer-readable storage medium coupled to the processors and storing one or more sequences of instructions which, when executed by the processors, cause the processors to perform the steps depicted in FIG. 4.

In step 402, a sensor device receives, using a wireless network transceiver, one or more experiment instructions for performing an experiment. Examples of experiments were described before.

In step 404, the sensor device generates, based on the one or more experiment instructions, one or more driving instructions for causing the object to drive along the track. The driving instructions may specify, for example, a torque (if the sensor device is equipped with a motor and the like) to be applied to wheels of the object to cause the object to drive along the track. The driving instructions may also specify acceleration amounts to be applied to the wheels of the object as the object drives along the rack, and the like. The track may be any type of straight, curved, closed, flat, uphill, downhill, or a combination thereof, and configured to provide a hard, continuous surface for driving the object.

In step 406, the sensor device executes the one or more driving instructions to cause the object to drive along the track. Execution of the driving instructions may be initiated upon receiving from, for example, a user computer, initiation instructions for initiating the execution of driving instructions. The initiation instructions may include an electric signal or a mechanical input that, once received, releases, for example, brakes installed on wheels of the toy-object allowing the object to move along the track. According to another example, the execution of the driving instructions may be initiated upon turning on a switch implemented on the sensor device that, once turned on, releases, for example, the brakes installed on the wheels of the toy-object allowing the object to move along the track.

Driving the object along the track may include applying the torque to the wheels of the object to cause the object to drive along the track. Alternatively, if the track is a downhill track, executing the driving instructions may include releasing brakes attached to the wheels of the object to cause the object to slide down the downhill track.

As the object is driving along the track, the sensor device receives, in step 408, from the one or more sensors, the motion values associated with the movements of the object along the track. The captured motion values may include position data, speed data, acceleration data, g-force data, and the like. All the captured motion values may be collected, for example, at discrete time points within a time period.

In step 410, the sensor device tests whether the experiment is to be stopped, finished, or otherwise terminated. For example, as the sensor device executes the driving instructions, the sensor device may determine that a time period for conducting the experiment has expired, and therefore, the experiment needs to be completed. According to another example, as the sensor device executes the driving instructions, the sensor device may receive instructions to stop the experiment, and therefore, the device will terminate the experiment. According to other examples, the sensor device may detect that the object has been removed from the track, and therefore, the experiment needs to be terminated.

If, in step 410, the sensor device determines that the experiment is to be stopped, finished, or otherwise terminated, then the sensor device proceeds to perform step 412. Otherwise, the sensor device proceeds to perform step 406 to continue executing the driving instructions to cause the object to drive along the track.

In step 412, the sensor device transmits, using the wireless network transceiver, the motion values associated with the movements of the object to one or more user devices. Transmitting the motion values to the one or more user devices causes a user device, from the one or more user devices, to generate a graphical representation of the motion values and display the graphical representation on a display device of the user device. The graphical representation may include a chart, a table, a graph, or any form used to arrange and display the motion values collected during the experiment. For example, the graphical representation may represent a graph showing the track on which the object was driven, and the corresponding motion values associated with the movements of the object along the track. The motion values may include, for example, top speed, distance traveled, maximum g-forces, gauges and speedometer readings and the like collected as the experiment was performed.

6. Example Process for Conducting a Multiple-Objects Experiment

Figure 5:
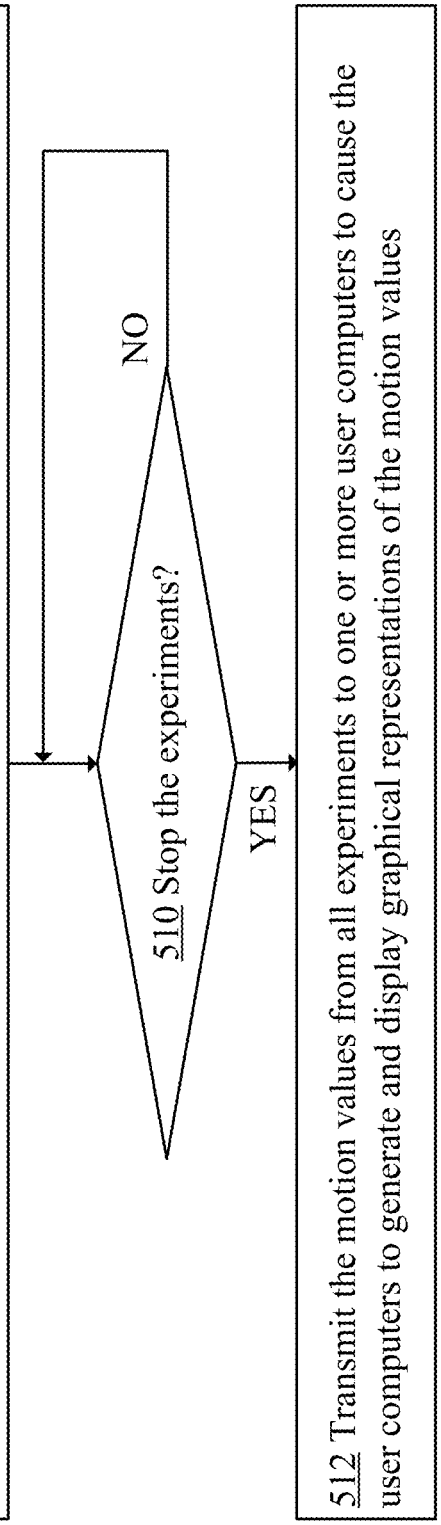
FIG. 5 is a flow diagram showing an example process of conducting a multiple-objects experiment.

FIG. 5 is a flow diagram showing an example process of conducting a multiple-objects experiment. The example process depicted in FIG. 5 may be executed by any type of computing device, including devices depicted in FIG. 1, such as a manager server 140, any teacher device 120, any student device 110, and the like. Manager server 140 may be configured to manage the conducting and monitoring of computer-and-sensor based physics experiments performed in computer environment 10, shown in FIG. 1. Manager server 140 may be implemented in a standalone server, a distributed server system, in a cloud system, and the like, and may be configured to host a variety of applications, including software applications defining scientific experiments, software applications for conducting scientific experiments, software applications for collecting data as scientific experiments are conducted, and the like.

Student devices 110 may be configured to execute software applications that allow downloading applications, experiment data, experiment results, statistical information about the experiments, experiment parameters, and the like, from storage 150.

Teacher devices 120 may be configured to execute software applications and to download the applications and data from storage 150. Teacher devices 120 may be configured to, for example, download experiment applications, experiment data, experiment results, statistical information about the experiments, experiment parameters, and the like, from storage 150. Upon downloading one or more experiment applications and data from storage 150, teacher devices 120 may execute the experiment applications, and send instructions either directly to object 102 or to manager server 140 to initiate the experiment, or cause student devices 110 to execute the experiment applications to conduct the corresponding experiments.

For simplicity of the description, it is assumed herein that the steps of FIG. 5 are performed by a user computer. The approach depicted in FIG. 5 allows conducting a plurality of experiments using a plurality of sensor devices and having a plurality of corresponding objects driving along their corresponding tracks. The experiments may be executed simultaneously, sequentially, or according to any time schedule. The results of the experiments may be collected and visualized graphically to allow the users to visually compare the experiments' results.

In step 502, a user computer transmits, to a plurality of sensor devices, a plurality of instruction sets for performing a plurality of experiments by the plurality of sensor devices integrated in a plurality of objects.

In some embodiments, transmitting the plurality of instruction sets to the plurality of sensor device causes each of the plurality of sensor devices to execute an instructions set, of the plurality of instructions sets, to cause a corresponding object, associated with the sensor device, to drive along a corresponding track.

In some embodiments, executing the plurality of instructions sets by the plurality of sensor devices causes the plurality of sensor devices to perform racing experiments in which corresponding objects, of the plurality of objects, race each other along their corresponding tracks.

The plurality of experiments may include a variety of experiments, including an experiment for determining motion of a physical object as the physical object drives along a physical track, an experiment for interpreting digital data collected as a physical object drives along a physical track, an experiment for developing a physical model of motion of a physical object as the physical object drives along a physical track, and an experiment for researching kinetic energy associated with driving a physical object along a physical track.

As the corresponding object drives along the corresponding track, the corresponding sensor device collects corresponding motion values associated with movements of the corresponding object as the corresponding object drives along the corresponding track, and the corresponding transceiver transmits the corresponding motion values to the user de computer vice, or a plurality of user devices. Transmitting the corresponding motion values to the user computer causes the user computer to generate a corresponding graphical representation of the corresponding motion values and display the graphical representation on a display device of the user computer.

In step 510, the user computer tests whether all experiments (or a group of experiments from the plurality of experiments) have been finished, stopped, or otherwise terminated. If so, then the user computer proceeds to perform step 512. Otherwise, the user computer continues testing in step 510.

In step 512, the user computer collects the motion values from all experiments (or the group of experiments) and transmits the motion values to one or more user computers to cause the user computers to generate graphical representations of the motion values and to display the graphical representation on display devices of the user computers.

7. Example Process for Conducting a Parametric Experiment

Figure 6:
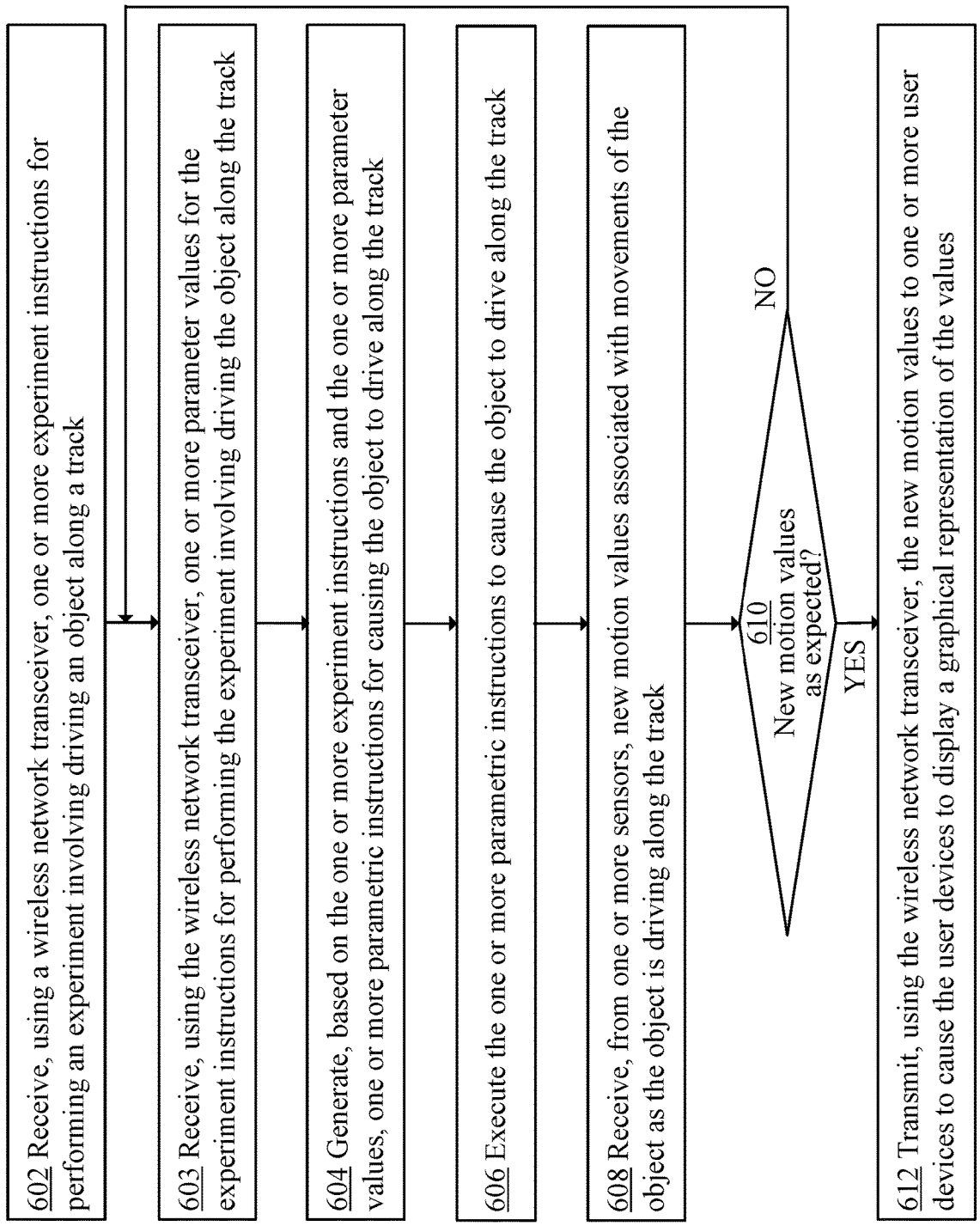
FIG. 6 is a flow diagram showing an example process for conducting a parametric experiment.

FIG. 6 is a flow diagram showing an example process for conducting a parametric experiment. The example process depicted in FIG. 6 may be executed by any type of sensor device, including sensor device 100 depicted in FIGS. 1 and 2A.

In step 602, a sensor device receives, using a wireless network transceiver, one or more experiment instructions for performing an experiment. Examples of experiments used in these embodiments include the parametric experiments in which a user (e.g., a student or a teacher) can provide one or more parameter values, and therefore, can model the outcome of the experiments.

In step 603, the sensor device receives, using the wireless network transceiver, one or more parameter values for the experiment instructions for performing the experiment involving driving the object along the track. The parameter values may include the values for the parameters such as speed, g-force, acceleration, length of the track, and the like.

In step 604, the sensor device generates, based on the one or more experiment instructions and the one or more parameter values, one or more parametric instructions for causing the object to drive along the track. The parametric instruction may, for example, include the parameter values provided by the user for the purpose of modeling the outcome of the experiment.

In step 606, the sensor device executes the one or more parametric instructions to cause the object to drive along the track.

As the object is driving along the track, the sensor device receives, in step 608, from the one or more sensors, new motion values associated with the movements of the object as the object is driving along the track.

Once the object finishes driving along the track, the sensor device determines, in step 610, whether the new motion values are as expected. This may be determined by, for example, downloading from storage 150 (shown in FIG. 1) the expected motion values precomputed for the parameter values provided by the user and using the experiment instructions received using the transceiver, and comparing the downloaded expected motion values with the new motion values collected by the sensor device as the parametric experiment was conducted.

If the new motion values match the expected motion values (either exactly or within a certain error margin), then the sensor device proceeds to perform step 612.

In step 612, the sensor device transmits, using the wireless network transceiver, the new motion values associated with the movements of the object to one or more user devices so that a user device, from the one or more user devices, can generate a new graphical representation of the motion values and display the new graphical representation on the display device of the user device.

However, in response to determining that the new motion values do not match the expected motion values, the sensor device may transmit, using the wireless network transceiver, a message indicating that the new motion values are not as expected. Furthermore, the sensor device may proceed to request one or more updated parameter values and repeat the process from step 603.

8. Improvements Provided by Certain Embodiments

In some embodiments, a present computer-and-sensor based platform provides many benefits to students and teachers. The platform provides a tool that allows the students to increase their proficiency and master the physics-related topics taught in SEP1, 2, 3, and 4 courses offered as part of the middle-school physical science teaching units. The platform, when used by the students to practice the hands-on-based activities, allows the students to study the science concepts interactively and in groups of students. The achievable outcomes are equally relevant in elementary and high school grades. Through its interactivity, the platform allows the students to ask questions related to science phenomena and gain the knowledge to answer those questions themselves.

9. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
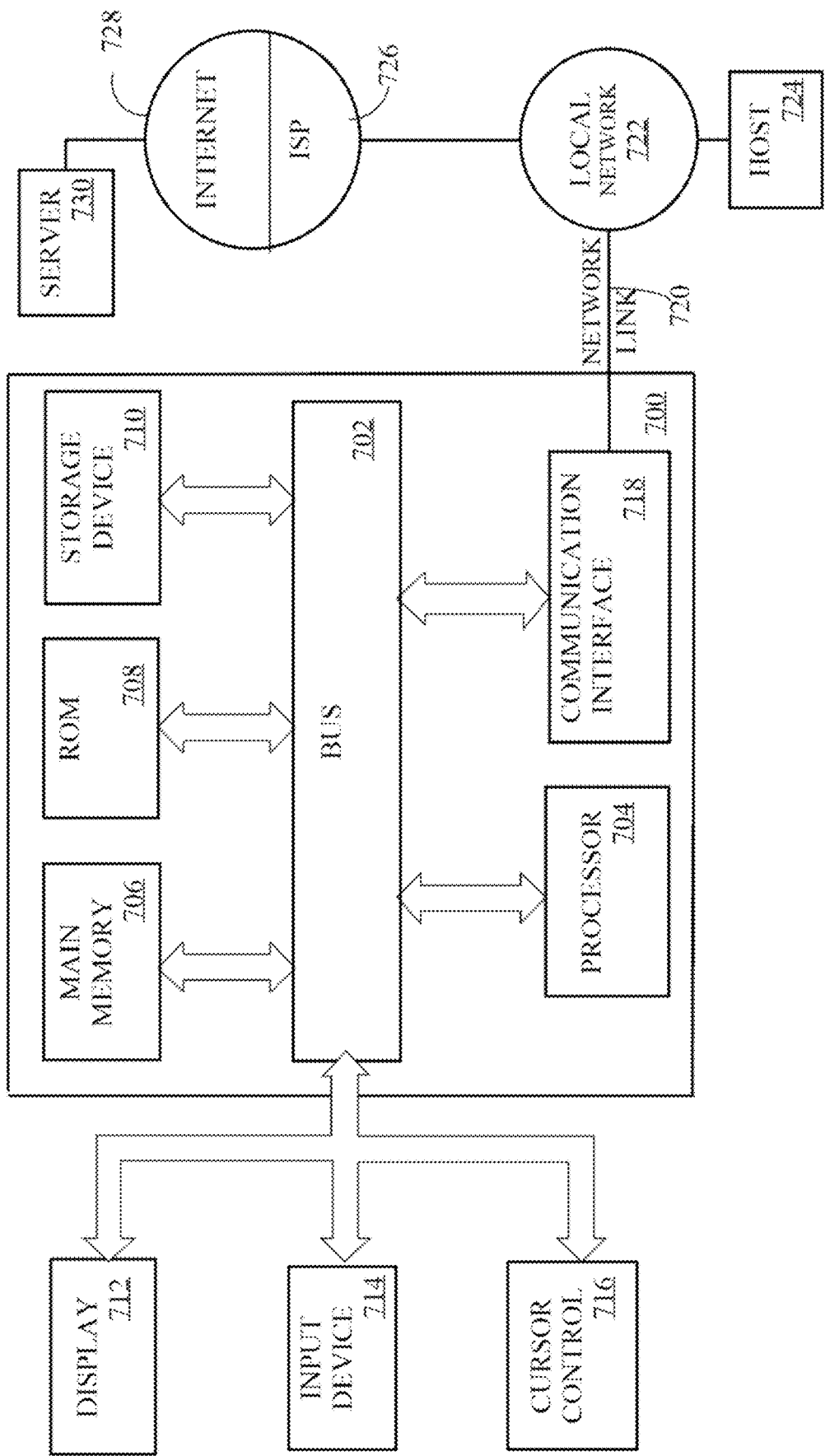
FIG. 7 is a block diagram of a computer system on which embodiments of the approach may be implemented.

FIG. 7 is a block diagram that depicts an example computer system 700 upon which embodiments may be implemented. Computer system 700 includes a bus 702 or other communication mechanism for communicating information, and a processor 704 coupled with bus 702 for processing information. Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. Although bus 702 is illustrated as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input-device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated service digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A sensor device integrated in a physical object, the sensor device comprising:
   one or more processors;
   one or more sensors coupled to the one or more processors and configured to capture motion values associated with movements of the physical object as the physical object drives along a physical track;
   a wireless network transceiver coupled to the one or more processors of the physical object;
   a non-transitory computer-readable storage medium coupled to the one or more processors of the physical object and storing one or more sequences of instructions which, when executed by the one or more processors, cause the one or more processors to perform:
   from a user-computer-device, receiving, by the wireless network transceiver implemented in the physical object, one or more experiment instructions for performing an experiment;

generating, based on the one or more experiment instructions, one or more driving instructions for causing the physical object to drive along the track;

executing the one or more driving instructions to cause the physical object to drive along the track;

as the physical object is driving along the track:

receiving, from the one or more sensors, the motion values associated with the movements of the physical object as the physical object is driving along the track;

transmitting, using the wireless network transceiver, the motion values associated with the movements of the physical object to one or more user devices; and wherein transmitting the motion values to the one or more user devices causes a user device, from the one or more user devices, to generate a graphical representation of the motion values and display the graphical representation on a display device of the user device.

2. The sensor device of claim 1, wherein the non-transitory computer-readable storage medium stores additional instructions for:

receiving, from a user computer, initiation instructions for initiating execution of the one or more driving instructions;

in response to receiving the initiation instructions, initiating execution of the one or more driving instructions to cause the physical object to drive along the track.

3. The sensor device of claim 2, wherein the user computer is further configured to perform:

transmitting, to a plurality of sensor devices, a plurality of instruction sets for performing a plurality of experiments by the plurality of sensor devices integrated in a plurality of physical objects;

wherein transmitting the plurality of instruction sets causes each of the plurality of sensor devices to perform:

executing an instructions set, of the plurality of instructions sets, to cause a corresponding physical object to drive along a corresponding track;

collecting corresponding motion values associated with the movements of the corresponding physical object as the corresponding physical object drives along the corresponding track;

transmitting the corresponding motion values to the user computer; and wherein transmitting the corresponding motion values to the user computer causes the user computer to generate a corresponding graphical representation of the corresponding motion values and display the graphical representation on a display device of the user computer.

4. The sensor device of claim 3, wherein executing the plurality of instructions sets by the plurality of sensor devices causes the plurality of sensor devices to perform racing experiments in which corresponding physical objects, of the plurality of physical objects, race each other along their corresponding tracks.

5. The sensor device of claim 3, wherein the plurality of experiments comprises an experiment for determining motion of a physical object as the physical object drives along a physical track, an experiment for interpreting digital data collected as a physical object drives along a physical track, an experiment for developing a physical model of motion of a physical object as the physical object drives along a physical track, and an experiment for researching kinetic energy associated with driving a physical object along a physical track.

6. The sensor device of claim 1, wherein the non-transitory computer-readable storage medium stores additional instructions for:

receiving, using the wireless network transceiver, one or more parameter values for the experiment instructions for performing the experiment involving driving the physical object along the track;

generating, based on the one or more experiment instructions and the one or more parameter values, one or more parametric instructions for causing the physical object to drive along the track;

executing the one or more parametric instructions to cause the physical object to drive along the track;

as the physical object is driving along the track, receiving, from the one or more sensors, new motion values associated with the movements of the physical object as the physical object is driving along the track;

once the physical object finishes driving along the track, determining whether the new motion values are as expected;

in response to determining that the new motion values are as expected, transmitting, using the wireless network transceiver, the new motion values associated with the movements of the object physical object to one or more user devices, wherein transmitting the new motion values to the one or more user devices causes the user device, from the one or more user devices, to generate a new graphical representation of the motion values and display the new graphical representation on the display device of the user device.

7. The sensor device of claim 6, wherein the non-transitory computer-readable storage medium stores additional instructions for: in response to determining that the new motion values are not as expected, transmitting, using the wireless network transceiver, a message indicating that the new motion values are not as expected and awaiting receiving one or more updated parameter values.

8. A method for measuring motion-related values associated with movements of a physical object as the objects physical object drives along a physical track, the method comprising:

receiving, using a wireless network transceiver, one or more experiment instructions for performing an experiment;

generating, based on the one or more experiment instructions, one or more driving instructions for causing a physical object to drive along a physical track;

executing the one or more driving instructions to cause the physical object to drive along the track;

as the physical object is driving along the track:

receiving, from one or more sensors, motion values associated with movements of the physical object as the physical object is driving along the track;

wherein the one or more sensors are coupled to one or more processors and configured to capture the motion values associated with the movements of the physical object as the physical object drives along the track;

transmitting, using the wireless network transceiver, the motion values associated with the movements of the physical object to one or more user devices; and wherein transmitting the motion values to the one or more user devices causes a user device, from the one or more user devices, to generate a graphical representation of the motion values and display the graphical representation on a display device of the user device.

9. The method of claim 8, further comprising: receiving, from a user computer, initiation instructions for initiating execution of the one or more driving instructions;
in response to receiving the initiation instructions, initiating execution of the one or more driving instructions to cause the physical object to drive along the track.

10. The method of claim 9, further comprising: transmitting, to a plurality of sensor devices, a plurality of instruction sets for performing a plurality of experiments by the plurality of sensor devices integrated in a plurality of physical objects;
wherein transmitting the plurality of instruction sets causes each of the plurality of sensor devices to perform:
executing an instructions set, of the plurality of instructions sets, to cause a corresponding physical object to drive along a corresponding track;
collecting corresponding motion values associated with the movements of the corresponding physical object as the corresponding physical object drives along the corresponding track;
transmitting the corresponding motion values to the user computer; and
wherein transmitting the corresponding motion values to the user computer causes the user computer to generate a corresponding graphical representation of the corresponding motion values and display the graphical representation on a display device of the user computer.

11. The method of claim 10, wherein executing the plurality of instructions sets by the plurality of sensor devices causes the plurality of sensor devices to perform racing experiments in which corresponding physical objects, of the plurality of physical objects, race each other along their corresponding tracks.

12. The method of claim 10, wherein the plurality of experiments comprises an experiment for determining motion of a physical object as the physical object drives along a physical track, an experiment for interpreting digital data collected as a physical object drives along a physical track, an experiment for developing a physical model of motion of a physical object as the physical object drives along a physical track, and an experiment for researching kinetic energy associated with driving a physical object along a physical track.

13. The method of claim 8, further comprising:
receiving, using the wireless network transceiver, one or more parameter values for the experiment instructions for performing the experiment involving driving the physical object along the track;
generating, based on the one or more experiment instructions and the one or more parameter values, one or more parametric instructions for causing the physical object to drive along the track;
executing the one or more parametric instructions to cause the physical object to drive along the track;
as the physical object is driving along the track, receiving, from the one or more sensors, new motion values associated with the movements of the physical object as the physical object is driving along the track;
once the physical object finishes driving along the track, determining whether the new motion values are as expected;
in response to determining that the new motion values are as expected, transmitting, using the wireless network transceiver, the new motion values associated with the movements of the physical object to one or more user devices, wherein transmitting the new motion values to the one or more user devices causes the user device, from the one or more user devices, to generate a new graphical representation of the motion values and display the new graphical representation on the display device of the user device.

14. The method of claim 13, storing additional instructions for: in response to determining that the new motion values are not as expected, transmitting, using the wireless network transceiver, a message indicating that the new motion values are not as expected and awaiting receiving one or more updated parameter values.

15. One or more non-transitory computer readable storage media storing one or more instructions which, when executed by one or more processors, cause the one or more processors to perform:
receiving, using a wireless network transceiver, one or more experiment instructions for performing an experiment;
generating, based on the one or more experiment instructions, one or more driving instructions for causing a physical object to drive along a physical track;
executing the one or more driving instructions to cause the physical object to drive along the track;
as the physical object is driving along the track:
receiving, from one or more sensors, motion values associated with movements of the physical object as the physical object is driving along the track;
wherein the one or more sensors are coupled to one or more processors and configured to capture the motion values associated with the movements of the physical object as the physical object drives along the track;
transmitting, using the wireless network transceiver, the motion values associated with the movements of the physical object to one or more user devices; and
wherein transmitting the motion values to the one or more user devices causes a user device, from the one or more user devices, to generate a graphical representation of the motion values and display the graphical representation on a display device of the user device.

16. The one or more non-transitory computer readable storage media of claim 15, storing additional instructions for: receiving, from a user computer, initiation instructions for initiating execution of the one or more driving instructions;
in response to receiving the initiation instructions, initiating execution of the one or more driving instructions to cause the physical object to drive along the track.

17. The one or more non-transitory computer readable storage media of claim 16, storing additional instructions for: transmitting, to a plurality of sensor devices, a plurality of instruction sets for performing a plurality of experiments by the plurality of sensor devices integrated in a plurality of physical objects;
wherein transmitting the plurality of instruction sets causes each of the plurality of sensor devices to perform:
executing an instructions set, of the plurality of instructions sets, to cause a corresponding physical object to drive along a corresponding track;
collecting corresponding motion values associated with the movements of the corresponding physical object as the corresponding physical object drives along the corresponding track;

transmitting the corresponding motion values to the user computer; and wherein transmitting the corresponding motion values to the user computer causes the user computer to generate a corresponding graphical representation of the corresponding motion values and display the graphical representation on a display device of the user computer.

18. The one or more non-transitory computer readable storage media of claim 17, wherein executing the plurality of instructions sets by the plurality of sensor devices causes the plurality of sensor devices to perform racing experiments in which corresponding physical objects, of the plurality of physical objects, race each other along their corresponding tracks.

19. The one or more non-transitory computer readable storage media of claim 17, wherein the plurality of experiments comprises an experiment for determining motion of a physical object as the physical object drives along a physical track, an experiment for interpreting digital data collected as a physical object drives along a physical track, an experiment for developing a physical model of motion of a physical object as the physical object drives along a physical track, and an experiment for researching kinetic energy associated with driving a physical object along a physical track.

20. The one or more non-transitory computer readable storage media of claim 15, storing additional instructions for: receiving, using the wireless network transceiver, one or more parameter values for the experiment instructions for performing the experiment involving driving the physical object along the track;

generating, based on the one or more experiment instructions and the one or more parameter values, one or more parametric instructions for causing the physical object to drive along the track;

executing the one or more parametric instructions to cause the physical object to drive along the track;

as the physical object is driving along the track, receiving, from the one or more sensors, new motion values associated with the movements of the physical object as the physical object is driving along the track;

once the physical object finishes driving along the track, determining whether the new motion values are as expected;

in response to determining that the new motion values are as expected, transmitting, using the wireless network transceiver, the new motion values associated with the movements of the physical object to one or more user devices, wherein transmitting the new motion values to the one or more user devices causes the user device, from the one or more user devices, to generate a new graphical representation of the motion values and display the new graphical representation on the display device of the user device.

* * * * *